United States Patent [19]

Fluckiger et al.

[11] 4,049,946
[45] Sept. 20, 1977

[54] POWER SUPPLY FOR ELECTRIC ARC WELDING

[75] Inventors: Jean-Louis Fluckiger; Pierre Alfred Roulet, both of Sao Paulo, Brazil

[73] Assignee: Eutectic Corporation, Flushing, N.Y.

[21] Appl. No.: 628,537

[22] Filed: Nov. 3, 1975

[51] Int. Cl.² ............................................. B23K 9/10
[52] U.S. Cl. ............................... 219/131 R; 219/135; 323/56
[58] Field of Search ........... 219/131 R, 131 WR, 135; 323/56, 66

[56] References Cited

U.S. PATENT DOCUMENTS

| | | | |
|---|---|---|---|
| 2,200,632 | 5/1940 | Mills | 219/131 R X |
| 2,617,913 | 11/1952 | Oestreicher | 219/135 |
| 2,644,109 | 6/1953 | Mulder | 219/131 R X |
| 3,188,552 | 6/1965 | Owen | 323/56 X |
| 3,463,903 | 8/1969 | Rudaz | 219/131 R X |
| 3,497,769 | 2/1970 | Stearns | 219/131 R X |
| 3,622,744 | 11/1971 | Main et al. | 219/131 R |
| 3,665,150 | 5/1972 | Mejia | 219/131 R |
| 3,684,942 | 8/1972 | Pettit, Jr. et al. | 219/131 WR X |
| 3,688,180 | 8/1972 | Chiasson et al. | 219/131 WR X |

FOREIGN PATENT DOCUMENTS

| | | | |
|---|---|---|---|
| 1,098,695 | 8/1955 | France | 219/131 R |
| 46-12894 | 4/1971 | Japan | 219/131 R |
| 46-4646 | 10/1968 | Japan | 219/131 W R |

Primary Examiner—J. V. Truhe
Assistant Examiner—Clifford C. Shaw
Attorney, Agent, or Firm—Hopgood, Calimafde, Kalil, Blaustein and Lieberman

[57] ABSTRACT

An arc welding power supply of the type which employs a saturable reactor circuit to control the supply power from an alternating current source to the welding electrode. A control circuit varies the current through the control winding of the saturable reactor to provide the desired welding current. An additional circuit monitors the welding current and disables the saturable reactor control circuit when the welding current drops below a low threshold value, thus reducing the open circuit voltage between the welding electrode and workpiece and minimizing the danger of electric shock to the welder while changing electrodes. The saturable reactor is connected in series with the primary winding of a transformer which also serves as the output winding of the saturable reactor.

1 Claim, 4 Drawing Figures

POWER SUPPLY FOR ELECTRIC ARC WELDING

The invention relates to a power supply for use in electric arc welding.

Arc welding power supplies are required to provide relatively high currents to generate and sustain the electric arc between the welding electrode and workpiece and to provide sufficient heat to efficiently perform the welding operation. Due to the heavy current requirements of the load in arc welding applications, it is not normally economically feasible to provide a regulated power source. However, since various types and sizes of welding electrodes and various workpieces require different welding currents, it is essential that the approximate welding current provided by the arc welding power supply be adjustable.

The voltage drop across the welding arc normally is relatively low, typically less than 40 volts. However, due to the relatively poor load regulation of arc welding power supplies, the open circuit voltage between the welding electrode and workpiece is substantially higher than the voltage across the welding arc. Typical open circuit voltages on the order of 80 volts or more are common.

When changing welding electrodes, a welder may very easily subject himself to the open circuit voltage between the electrode and workpiece, and thus be injured by the resulting electric shock.

It is an object of the present invention to provide an arc welding power supply in which the likelihood of shock to the welder is substantially reduced. It is a further object of the invention to provide an improved transformer arrangement in an arc welding power supply.

As herein described, according to one aspect of the present invention, there is provided a power supply for use in electric arc welding, including a transformer having a primary and secondary winding. An arc welding electrode is coupled to one terminal of the secondary winding of the transformer and a conductive member is connected to the other terminal. The terminals of the primary winding are coupled through a variable impedance element to an alternating current power source. A control circuit selectively varies the impedance of the variable impedance element to vary the secondary current which flows in the secondary winding of the transformer when an arc is struck upon contact of the electrode with the conductive member. The operation of the control circuit is modified in response to the transformer secondary current to substantially reduce the voltage between the secondary winding terminals of the transformer when the secondary current is less than a predetermined threshold value, thereby to substantially reduce the danger of electric shock to a welder changing the electrode while the power supply is operative.

According to another aspect of the invention a transformer arrangement is provided for controlling the supply of current from an alternating current power source to a load. A first core of magnetic material is provided, as well as second and third cores of magnetic material having a relatively high incremental permeability when subjected to a magnetic flux density below a given value and a relatively low incremental permeability when subjected to a magnetic flux density above said given value. A control winding is disposed about the aforementioned second and third cores. A first primary winding is disposed about the first and second cores and a second primary winding is disposed about the first and third cores. At least one secondary winding is disposed about the first core. The primary winding is coupled to the power source and the secondary winding to the load, and a direct current control signal is coupled to the control winding to vary the current delivered to the load by varying the incremental permeability of each of the second and third cores.

To the accomplishment of the above and any other objects which may hereinafter appear, the invention relates to an arc welding power supply as defined in the appended claims as considered with the following detailed description of a preferred embodiment thereof taken together with the accompanying drawings in which:

Figure 1:
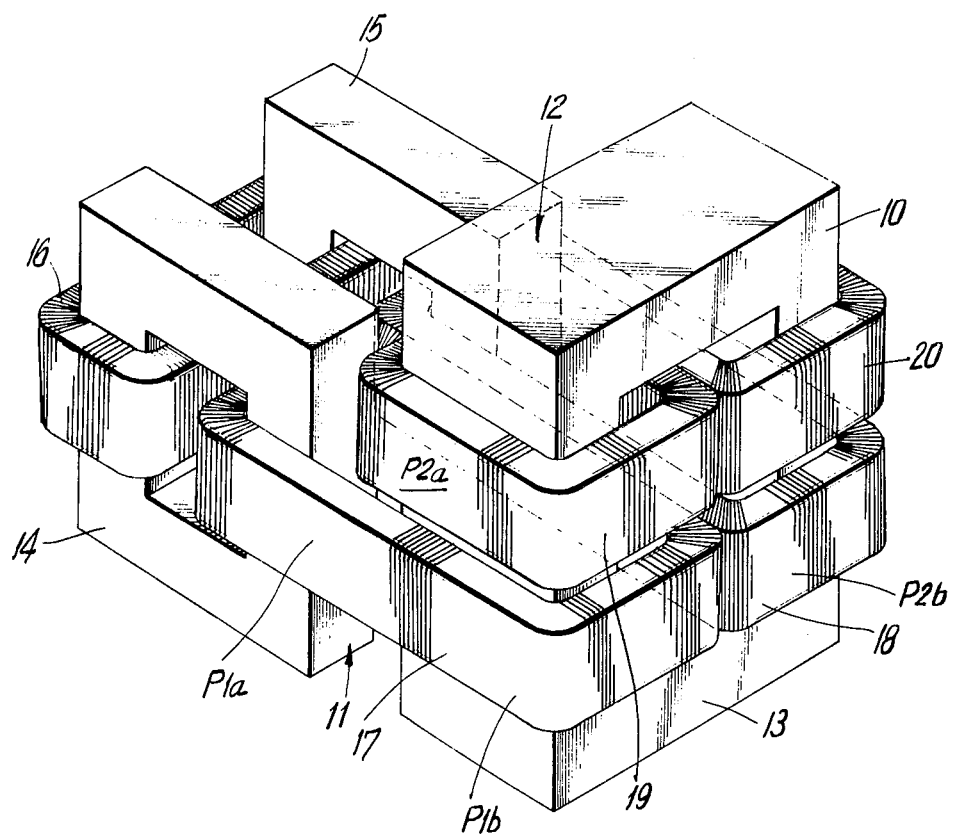
FIG. 1 is a stylized perspective view of a magnetic circuit arrangement according to an embodiment of the present invention.

The magnetic circuit arrangement shown in FIG. 1 comprises a welding transformer 10 and saturable reactors 11 and 12. The transformer 10 has an open rectangular core 13 of magnetic material. The core 13 preferably comprises laminated sheets insulated from one another or a ferrite material, in order to provide higher effective electrical resistivity and thus reduce any current and hysteresis losses.

The saturable reactors 11 and 12 have open rectangular cores 14 and 15 respectively, each core being formed of a suitable "square-loop" magnetic material. Such magnetic material is characterized by having a relatively high incremental permeability when subjected to a flux density below a predetermined threshold value, while exhibiting a rapid decrease to a relatively low incremental permeability when the magnetic flux density in the material exceeds said threshold value.

A single control winding 16 is disposed about the saturable reactor cores 14 and 15, and a primary winding 17 is disposed about the transformer core 13 and the saturable reactor core 14. Primary winding 17 serves both as the output winding of the saturable reactor 11 and as a primary winding of the welding transformer 10. A second primary winding 18 is disposed about the transformer core 13 and the saturable reactor core 15. Primary winding 18 serves both as the output winding of the saturable reactor 12 and a primary winding of the transformer 10.

The transformer 10 is also provided with secondary windings 19 and 20 disposed about the transformer core 13 at positions adjacent the primary windings 17 and 18, respectively.

Figure 2:
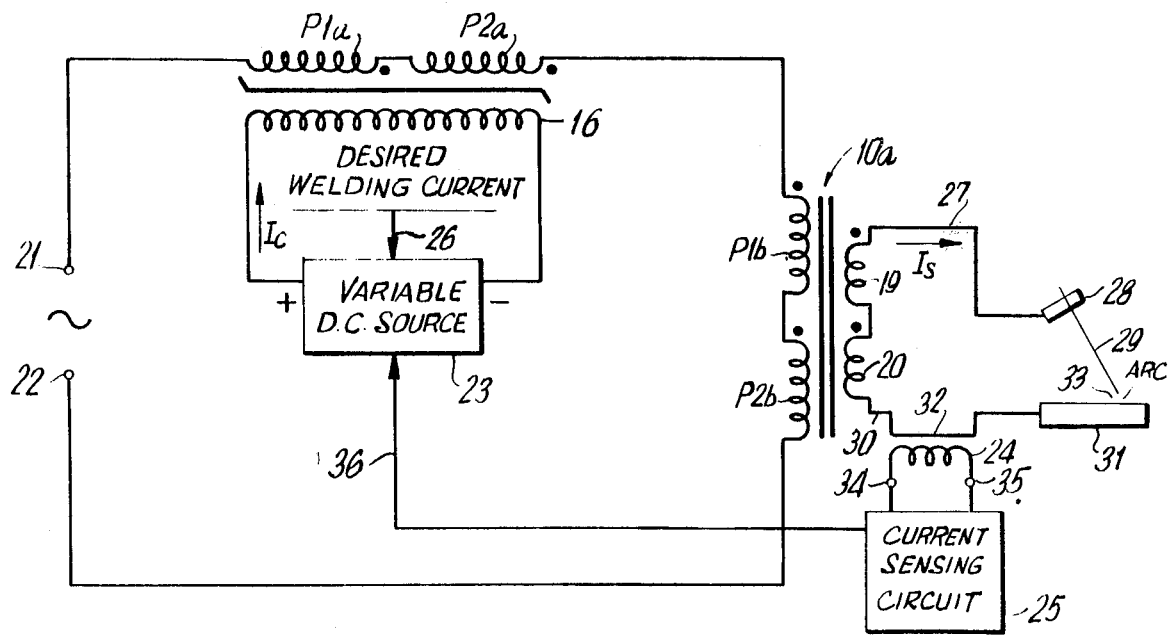
FIG. 2 is a block diagram illustrating the principle of operation of an embodiment of the present invention.

Thus, as shown schematically in FIG. 2, the primary winding 17 may be considered as having a first portion P1a constituting the output winding of the saturable reactor 11 and a second portion P1b constituting a primary winding of the welding transformer 10, with the windings P1a and P1b being effectively connected in series relationship.

Similarly, the primary winding 18 may be considered as having a first portion P2a, which constitutes the output winding of the saturable reactor 12, and a second portion P2b, which constitutes a primary winding of the welding transformer 10, with the windings P2a and P2b being effectively in series relationship.

FIG. 2 illustrates the manner in which the magnetic circuit shown in FIG. 1 may be utilized to control a welding operation. The arc welding power supply shown in FIG. 2 comprises a pair of terminals 21 and 22 for connecting the power supply to an alternating current power source, a saturable reactor arrangement comprising control winding 16 and "output" windings P1a and P2a, and a transformer 10a having a primary comprising the windings P1b and P2b and a secondary comprising the windings 19 and 20. A variable DC source 23 is connected to the control winding 16 and a current pickup transformer or coil 24 is connected to a current sensing circuit 25, which, in turn, is also connected to the variable current source 23.

The variable current source 23 provides a direct current to the control winding 16 of the saturable reactor circuit comprising the saturable reactors 11 and 12 (see FIG. 1). This direct current may be either constant or pulsating, and its magnitude may be varied according to the desired welding current by means of a mechanical or electronic current selection signal 26.

When a relatively high welding current is desired, the current selection signal 26 causes the current source 23 to provide a relatively high control current $I_c$ to the control winding 16 of the saturable reactor arrangement comprising saturable reactors 11 and 12. This high control winding current produces a flux density in the saturable reactor cores 14 and 15 that is sufficiently high to reduce the incremental permeability of the cores to a relatively low value. The net result of this saturation effect is that the "output" windings P1a and P2a exhibit a relatively low reactance to the flow of alternating current therethrough, thus providing a relatively large current flow to the primary windings P1b and P2b of the welding transformer 10a.

When a somewhat lower welding current is desired, the welding current selection signal 26 is changed so as to decrease the current $I_c$ provided to the control winding 16 of the saturable reactors 11 and 12 by the current source 23. This reduced control winding current results in a flux density in the cores 14 and 15 which is below the aforementioned threshold value, so that the "output" windings P1a and P2a exhibit a relatively high reactance to the flow of alternating current from the power source to the primary windings P1b and P2b of the welding transformer 10a, thus resulting in a reduced welding current.

It should be appreciated that the aforementioned explanation is simplified in order to give an overall view of the manner in which the saturable reactor arrangement acts to control the flow of welding current. Actually, the flux density within the cores 14 and 15 of the saturable reactors 11 and 12 is the resultant of the flux density produced by the direct current flowing through the control winding 16 and the alternating current flowing through the "output" windings P1a and P2a. During a portion of each cycle of current flow from the alternating current power source, the cores 14 and 15 exhibit relatively low incremental permeability, while exhibiting relatively high incremental permeability throughout the remaining portion of each alternating current cycle. These proportions are varied in response to variations in the current $I_c$ flowing through the control winding 16, thus enabling continuously variable control of the welding current.

The welding transformer 10a comprises primary winding portions P1b and P2b connected in series-aiding relation and secondary windings 19 and 20, also connected in series-aiding relation. A conductor 27 connects one end of the secondary winding to a welding electrode holder or clamp 28, which is mechanically and electrically attached to a welding electrode 29. A second conductor 30 electrically connects the other end of the secondary winding to a conductive workpiece 31.

The current sensing pickup coil or transformer 24 is disposed in proximity to a section 32 of the conductor 30 so that the secondary current Is flowing in the secondary winding of the welding transformer 10a through the welding electrode 29 and the workpiece 31 when an arc 33 is struck therebetween induces a corresponding voltage between the terminals 34 and 35 of the pickup coil 24.

The current sensing circuit 25 is connected to the terminals 34 and 35 of the pickup coil 24 and provides an output signal on line 36 which is dependent upon the magnitude of the secondary current Is of the welding transformer 10a. The output signal of the current sensing circuit 25 on line 36 is coupled to the DC current source 23 in such a manner as to disable the current source 23 when the secondary current Is is less than a low predetermined value.

Thus, when the secondary current Is falls to a low value, i.e. below that normally associated with a welding operation, the current sensing circuit 25 disables the current source 23, reducing the control winding current $I_c$ to zero and raising the effective reactance of the saturable reactor "output" windings P1a and P2a to a relatively high value, thereby reducing the open circuit voltage between the secondary terminals of the transformer 10a, i.e. between the welding electrode 29 and workpiece 31, to a value sufficiently low to minimize the danger of electric shock to the welder while he is changing electrodes or otherwise handling the welding equipment.

When a welding operation is initiated, the welder causes the welding electrode 29 to contact the workpiece 31, thus striking an arc therebetween and causing a flow of secondary current Is. This secondary current flow induces a corresponding voltage in the pickup coil 24 and causes the current sensing circuit 25 to cease disabling the current source 23, thus permitting the source 23 to supply a current $I_c$ to the control winding 16 of the saturable reactors 11 and 12 in accordance with the current selection signal 26. Thereupon the power supply operates in conventional manner to deliver the desired welding current to the arc 33.

The current sensing circuit 25 is designed so that it rapidly responds to an increase in secondary current from zero to a threshold value sufficient to cause the circuit 25 to cease disabling the current source 23, but responds relatively slowly to a decrease in secondary current below said threshold value. This characteristic permits the power supply to operate normally despite fluctuations in the welding current, which may momentarily drop below the threshold value during the welding operation, especially where a relatively long welding arc is employed. If the aforementioned delayed response were not provided, any momentary decrease in welding current below the threshold value would result in disabling the current source 23 and thus dropping the secondary voltage to a value that was insufficient to sustain the welding arc.

Thus it is seen that the circuit arrangement of FIG. 2 provides a saturable reactor controlled electric arc welding power supply which is capable of normal operation while at the same time providing a relatively low open circuit secondary voltage in order to minimize the danger of electric shock to a welder while changing electrodes or otherwise handling the welding equipment with the power supply in operation.

Figure 3:
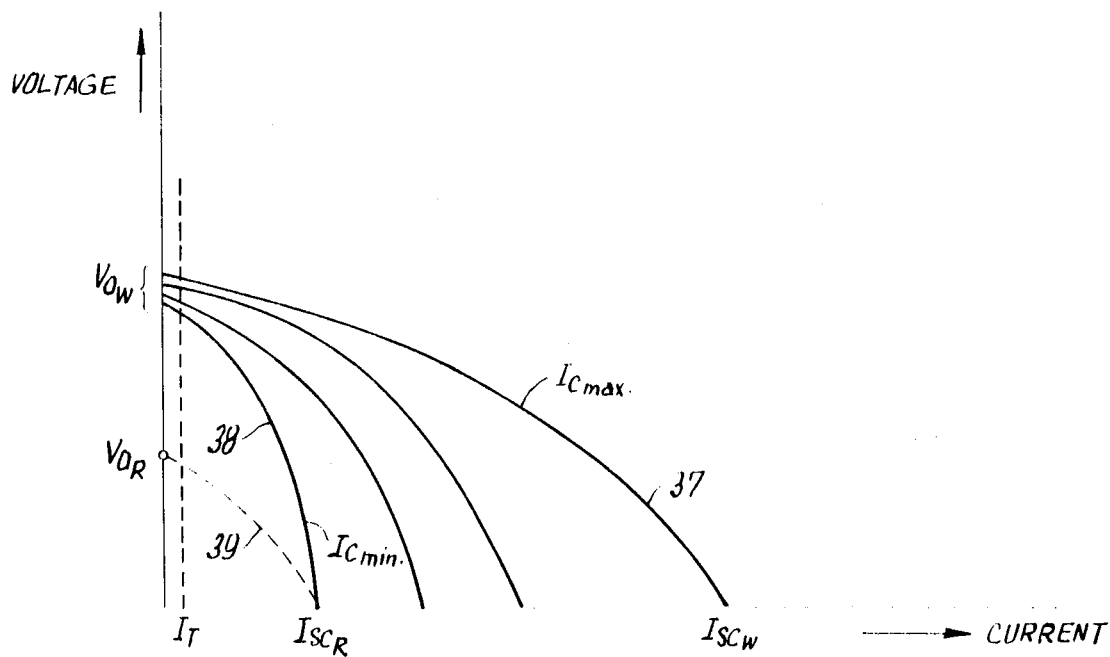
FIG. 3 is a graphical representation of the voltage-current characteristics of an arc welding power supply constructed according to an embodiment of the present invention.

The voltage-current characteristic curves of the power supply of FIG. 2 are shown in FIG. 3. With the welding current set at its maximum value by a suitable adjustment of the current selection signal 26, the voltage-current characteristic of the power supply is that indicated by curve 37. As seen in FIG. 3, this curve provides a short circuit working current having a value $I_{scw}$. With the welding current set at a minimum value by an adjustment of the current selection signal 26, the power supply exhibits the voltage-current characteristic indicated by curve 38, with a short circuit current $I_{sc}$.

All of the characteristic curves throughout the welding range of the power supply, i.e. all curves between curves 37 and 38, have an open circuit working voltage approximately equal to Vow, which may typically have a value on the order of 80 volts. This open voltage circuit is sufficient to constitute an electrical shock hazard to a welder changing electrodes or otherwise handling the welding equipment. Due to the operation of current sensing circuit 25, however, when the welding current drops below a threshold value $I_T$ the operation of the current source 23 is modified so as to shift the voltage-current characteristic of the power supply to that indicated as curve 39, thus reducing the open circuit "rest" voltage $V_{oR}$ to a value substantially less than the open circuit working voltage Vow. The value of the open circuit "rest" voltage $V_{oR}$ is typically in the order of one-half the open circuit working voltage Vow, on the order of 40 volts.

When the welder has changed electrodes and commences to strike an arc in order to commence welding, the power supply initially starts to operate on characteristic curve 39. However, as soon as the welding current exceeds the threshold value $I_T$ of the current sensing circuit 25, the current source 23 ceases to be disabled, thus causing the operation of the power supply to revert to a selected characteristic curve between curves 37 and 38, i.e., normal welding operation.

Figure 4:
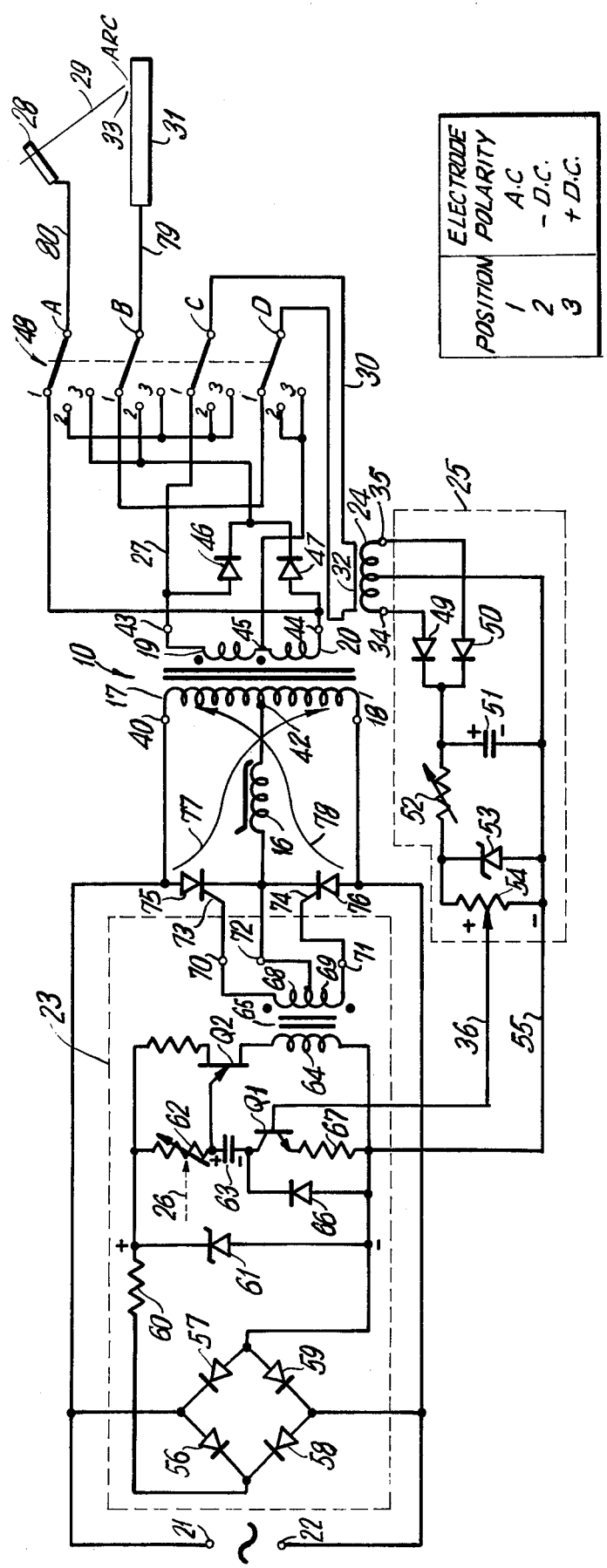
FIG. 4 is a schematic diagram of an arc welding power supply constructed according to a preferred embodiment of the present invention.

A schematic diagram of a circuit for performing the functions indicated in the circuit of FIG. 2 is shown in FIG. 4.

As shown in FIG. 4, the primary windings 17 and 18 of the welding transformer 10 are interconnected in series-aiding relation so as to form a composite center-tapped primary winding having end terminals 40 and 41 and a center tap 42. Similarly, secondary windings 19 and 20 are interconnected in series-aiding relation to form a center-tapped composite secondary winding with end terminals 43 and 44 and a center tap 45. The secondary winding of the welding transformer 10 is coupled to the welding electrode 29 and workpiece 31 through a switch arrangement including rectifying diodes 46 and 47 and a four-pole, three-position polarity selector switch 48.

With the polarity selector switch 48 in position 1, (as shown in FIG. 4), the terminals 43 and 44 of the secondary winding of the welding transformer 10 are coupled to the welding electrode 29 and workpiece 31, respectively, for alternating current welding operation.

With the polarity selector switch 48 in position 2, the rectifying diodes 46 and 47 are placed in circuit with the transformer secondary and the welding equipment to provide direct current welding operation with the electrode 29 being negative relative to the workpiece 31.

With the polarity selector switch 48 in position 3, the rectifying diodes 46 and 47 are placed in circuit with the transformer secondary and the welding equipment to provide direct current welding operation with the electrode 29 being positive relative to the workpiece 31.

In all three positions of the polarity selector switch 48, the welding current passes through the segment 32 of the conductor 30, and is sensed by the pickup coil 24. With the polarity selector switch in positions 2 or 3, the current through conductor segment 32 is a pulsating direct current resulting from full-wave rectification of the current from the welding transformer secondary winding. Thus only the alternating current component of this pulsating direct current is sensed by the pickup coil 24, so that the threshold for operation of the sensing circuit 25 to cease disabling the control circuit 23 is slightly greater than it is for alternating current operation when the selector switch is in position 1. However, this difference in threshold level is not significant, and the circuit operates in substantially the same manner for DC as for AC welding conditions.

The current sensing circuit 25 includes diodes 49 and 50 which provide full-wave rectification of the signal from the secondary current pickup coil 24, causing a capacitor 51 to be charged to a voltage corresponding to the magnitude of the alternating current component of the current flowing through the secondary circuit of the welding transformer 10.

Coupled to the capacitor 51 is a variable resistor 52 which establishes the rate of discharge of the capacitor 51, and a Zener diode 53 which limits the voltage developed by the current sensing circuit 25 to a value which will not damage any other circuit components. A variable voltage divider or potentiometer 54 is disposed in parallel with the Zener diode 53. The arm of a potentiometer 54 is coupled to the base of a transistor Q1 situated within the current control circuit 23. A conductor 55 provides a common ground connection between the current control circuit 23 and the current sensing circuit 25.

When the current through the secondary circuit of the welding transformer 10 exceeds a predetermined threshold value $I_T$, the voltage developed between the conductors 36 and 55 is sufficient to switch the transistor Q1 into conduction, thus enabling the current control circuit 23 to provide direct current to the control winding 16 of the saturable reactors 11 and 12 (see FIG. 1). When the current flow through the secondary circuit of the welding transformer 10 is below the aforementioned threshold value $I_T$, the voltage between the conductors 36 and 55 is insufficient to cause the transistor Q1 to conduct, thus disabling the current control circuit 23 from providing a flow of direct current to the control winding 16 of the saturable reactors 11 and 12.

Power for the operation of the current control circuit 23 is derived from the terminals 21 and 22 (for coupling to the alternating current power source) by a bridge rectifier network consisting of diodes 56 through 59. The resulting pulsating full-wave rectified direct current is coupled through a voltage dropping resistor 60 to a Zener diode 61 which limits the magnitude of the voltage excursions of the resulting pulsating direct current. A time-constant charging network is coupled across the terminals of the Zener diode 61, the charging network comprising a variable resistor 62, a charging capacitor 63, the collector-to-emitter path of transistor Q1, and a resistor 67. A discharge path for the capacitor 63 is provided by the emitter-to-lower base path of a unijunction transistor Q2, the primary winding 64 of a thyristor firing transformer 65, and a diode 66.

On each half cycle of the alternating current power source, a corresponding cycle of pulsating direct current appears across the Zener diode 61. As the voltage rises across Zener diode 61, current flows through the charging resistor 62, charging the capacitor 63, the collector-to-emitter path of transistor Q1, and the resistor 67 to cause the voltage across the capacitor 63 to increase as the capacitor becomes charged.

When the voltage across capacitor 63 reaches a sufficiently high value, the emitter junction of the unijunction transistor Q2 breaks down, causing the capacitor 63 to rapidly discharge through the primary winding 64 of the thyristor firing transformer 65 and the diode 66. This rapid pulse of current induces corresponding pulses in the secondary windings 68 and 69 of the thyristor firing transformer 65, the polarities of these pulses being such that the end terminals 70 and 71 of the secondary windings 68 and 69, respectively, are positive with respect to the center of terminal 72 thereof.

The thyristor firing pulses, which appear at the terminals 70 and 71 in timed relationship to the alternations of the alternating current power source coupled to terminals 21 and 22, are coupled to the control electrodes 73 and 74 of thyristors 75 and 76, respectively.

The anodes of thyristors 75 and 76 are connected to terminals 21 and 22, respectively, and the cathodes of thyristors 75 and 76 are connected to each other and to the center tap terminal 72 of thyristor firing transformer 65, and to one end of the control winding 16 of the saturable reactors 11 and 12. The other end of the control winding 16 is connected to the center tap 42 of the composite primary winding of welding transformer 10.

During normal welding operation, i.e. with transistor Q1 conducting, the current control circuit 23 continually generates firing pulses to the control electrodes 73 and 74 of the thyristors 75 and 76, respectively. The timing relation of these firing pulses with respect to the alternations or cycles of the alternating current power source connected to the terminals 21 and 22, is controlled by the variable resistor 62, which is adjusted manually in accordance with the desired welding current. The timing of the firing pulses relative to the alternations of the power source determines the portion of each power source cycle that the thyristors 75 and 76 are in conduction, and thus determines the value of the direct current flowing through the saturable reactor control winding 16.

Although thyristor firing pulses are applied to the control electrodes of both thyristors 75 and 76 during each half cycle of the alternating current power source, only the thyristor having its anode positive relative to its cathode at the time the firing pulse is applied to its control electrode will be triggered into conduction.

For example, during the half cycle that terminal 21 is positive with respect to terminal 22 the thyristor 75 will be rendered conductive when a firing pulse is applied to its control electrode 73. At this time current will flow through the thyristor 75, the control winding 16, and the lower half 18 of the composite primary winding of the welding transformer 10, as indicated by the directional arrow 77. During the other half cycle of the alternating current power source, i.e. when the terminal 22 is positive relative to the terminal 21, current will commence flowing through the thyristor 75 when a firing pulse is applied to its control electrode 74. Current will then flow through the thyristor 76, control winding 16, and the upper half 17 of the composite primary winding of the welding transformer 10, as indicated by the directional arrow 78. Thus, it is apparent that current flowing through the control winding 16 is unidirectional, and its value varies in accordance with the timing of the firing pulses applied to the control electrodes 73 and 74, i.e. with the setting of the welding current control 62.

As previously discussed, variation in the direct current flowing through the saturable reactor 16 caused by adjustment of the welding current control 62, results in a corresponding variation of the voltage-current characteristics exhibited by the power supply.

During the welding operation, the voltage induced in the secondary current pickup coil 24 as a result of secondary current flowing through the conductor segment 32, causes the capacitor 51 to be charged to a value sufficient to develop a voltage between the conductors 36 and 55 to maintain the transistor Q1 in conduction. A momentary decrease of welding current to low values or to zero as a result of irregularities in current flow through the welding arc 33 does not disrupt the operation of the power supply, since such momentary interruptions are filtered by the capacitor 51, which maintains the transistor Q1 in conduction during such temporary secondary current interruptions.

A typical sequence of events in a welding operation utilizing the power supply of FIG. 4 is as follows: The welder activates the power supply by connecting it to an alternating current power source (typically 110-120 volts, 60 cycles, or 220-240 volts, 50 to 60 cycles) via the terminals 21 and 22. He then sets the polarity selector switch 48 in the desired position for alternating current, straight polarity (electrode negative), or reverse polarity (electrode positive) welding operation. Since the welding operation has not yet commenced, the current flow through the secondary winding of the welding transformer 10 and through the conductor segment 32 is essentially zero. Thus no significant voltage is induced in the current sensing pickup coil 24, and no voltage is developed between the conductors 36 and 55, so that transistor Q1 is in a non-conductive state. Trigger impulses to the control electrodes 73 and 74 of the thyristors 75 and 76 are therefore not generated, and these thyristors remain non-conductive. Therefore, no current is provided to the control winding 16 of the saturable reactors 11 and 12 (see FIG. 1), so that the portions P1a and P2a of the primary windings 17 and 18 of the welding transformer 10 introduce a relatively high series reactance, thus causing the voltage across the secondary terminals 43 and 44 of the welding transformer to have a relatively low value $V_{oR}$ (see FIG. 3) on the order of 40 volts, a value insufficient to represent a serious danger of electric shock to the welder.

The welder then connects the conductor 79, extending from terminal B of the switch 48, to the workpiece 31, and conductor 80, extending from terminal A of the switch 48 and terminating in the clamp 28, to the conductive end portion of welding electrode 29. As previously mentioned, the relatively low open circuit voltage across the secondary terminals of the welding transformer 10, i.e. between terminals A and B, permits the welder to perform these operations without serious concern for electric shock.

The welder then commences the welding operation by momentarily touching the welding electrode 29 to the workpiece 31 to strike an arc 33 therebetween. As soon as the welding electrode 29 and workpiece 31 are brought into contact, current flows through the secondary of the welding transformer 10 and through the conductor segment 32, inducing a voltage in the current sensing pickup coil 24. This induced voltage is rectified by the diodes 49 and 50 and rapidly charges the capacitor 51 (typically within a fraction of a second) to a value sufficient to bias the transistor Q1 into conduction via the conductors 36 and 55.

As soon as the transistor Q1 becomes conductive, the current control circuit 23 begins to operate, generating trigger pulses to the control electrodes 73 and 74 of the thyristors 75 and 76 in timed relation (determined by the setting of the welding current control 62) to the alternations of the alternating current power supply connected to the terminals 21 and 22. The thyristors 75 and 76 are thus rendered alternately conductive and provide a pulsating direct current to the control winding 16 of the saturable reactors 11 and 12 (see FIG. 1), thus reducing the series reactance presented to the portions P1a and P2a of the primary windings 17 and 18 of the welding transformer 10, and shifting the operation of the power supply to a curve between the curves 37 and 38 (see FIG. 3), with a corresponding open circuit voltage $V_{ow}$ on the order of 80 volts, i.e. approximately twice the open circuit voltage $V_{oR}$ provided when the welding electrode 29 is removed from the workpiece 31.

The power supply continues to operate along one of the curves between curve 37 and curve 38 shown in FIG. 3, the corresponding 80 volt open circuit voltage being sufficient to maintain the arc 33 at substantially all spacings between the tip of the welding electrode 29 and the workpiece 31 required for normal welding operations.

When the welder desires to rest, or temporarily terminates the welding operation in order to replace the electrode 29, which is usually consumed during the welding process, with a fresh electrode, he moves the clamp 28 and welding electrode 29 away from the workpiece 31, thus breaking the arc 33 and open-circuiting the secondary of the welding transformer 10. The capacitor 51 ceases to be charged by the pickup coil 24, and thus discharges through the variable resistor 52, the upper portion of the potentiometer 54, and the parallel combination of (i) the base-to-emitter path of transistor Q1 and resistor 67 and (ii) the lower portion of potentiometer 54. After a few seconds, capacitor 51 has discharged so that the voltage between the conductors 36 and 55 is no longer sufficient to maintain transistor Q1 in conduction, and transistor Q1 becomes nonconductive, thus disabling the current control circuit 23. Thereupon the open circuit voltage between the terminals A and B of the switch 48 reverts to the relatively low value $V_{oR}$ (see FIG. 3) to enable the welder to change the electrode 29 without fear of electric shock.

Thus there is provided an arrangement which permits normal welding operations to be conducted with electrically variable control of the welding current, while at the same time permitting the welder to change electrodes or rest while the power supply is in operation, with substantially reduced danger of electric shock.

Although the present invention has been hereinabove specifically described with respect to a single embodiment thereof, it will be understood that modifications may be made therein without necessarily departing from the spirit and scope of the invention.

What is claimed is:

1. A power supply for use in electric arc welding, comprising:
   a transformer having a center tapped primary winding and a secondary winding;
   a pair of conductors for coupling said secondary winding to an arc welding arrangement comprising an arc welding electrode and a conductive member;
   current sensing means coupled to at least one of said conductors for providing a signal dependent upon the current flowing through said arc welding arrangement;
   means for coupling the ends of said primary winding remote from said center tap to an alternating current power source;
   a saturable reactor having a control winding and an output winding coupled to said primary winding, one end of said control winding being connected to the center tap of said primary winding;
   a first thyristor having two main electrodes and a control electrode, one main electrode of said thyristor being coupled to a corresponding end of said primary winding and the other main electrode of said thyristor being coupled to the other end of said control winding;
   a second thyristor having two main electrodes and a control electrode, one main electrode of said second thyristor being coupled to the other end of said primary winding and the other main electrode of said second thyristor being coupled to said other end of said control winding;
   a phase control circuit for providing firing pulses to the control electrodes of said first and second thyristors in timed relation with the alternations of said power source, and
   control circuit modifying means coupled to said current sensing means for disabling said phase control circuit to prevent said pulses from being applied to said control electrodes when the current flowing through said arc welding arrangement is less than a predetermined value.

* * * * *